United States Patent
Zhang et al.

(10) Patent No.: US 9,902,482 B2
(45) Date of Patent: Feb. 27, 2018

(54) DEEP ROLLING FORMING

(71) Applicant: The Boeing Company, Chicago, IL (US)

(72) Inventors: Hao Zhang, Camas, WA (US); Ryan Paul Quarberg, Portland, OR (US)

(73) Assignee: THE BOEING COMPANY, Chicago, IL (US)

(*) Notice: Subject to any disclaimer, the term of this patent is extended or adjusted under 35 U.S.C. 154(b) by 112 days.

(21) Appl. No.: 14/925,458

(22) Filed: Oct. 28, 2015

(65) Prior Publication Data

US 2017/0121006 A1    May 4, 2017

(51) Int. Cl.
| | |
|---|---|
| *B23P 9/02* | (2006.01) |
| *B64C 1/12* | (2006.01) |
| *B21B 1/08* | (2006.01) |
| *C21D 7/08* | (2006.01) |
| *B24B 39/00* | (2006.01) |
| *B21D 31/00* | (2006.01) |

(52) U.S. Cl.
CPC .................. *B64C 1/12* (2013.01); *B21B 1/08* (2013.01); *B23P 9/02* (2013.01); *B24B 39/00* (2013.01); *C21D 7/08* (2013.01); *B21D 31/005* (2013.01)

(58) Field of Classification Search
CPC ........... B21B 1/08; B21B 37/58; B21B 37/62; B21D 1/02; B21D 1/06; B21D 11/02; B21D 31/005; B44B 5/0047; C21D 7/02; C21D 7/04; C21D 7/08; B23P 9/02; B23P 9/00; C22F 1/00
See application file for complete search history.

(56) References Cited

U.S. PATENT DOCUMENTS 4,974,434 A * 12/1990 Reccius .................. B21D 1/00
29/81.01
5,072,606 A * 12/1991 Koehler .................. B24C 1/10
29/90.7

(Continued)

FOREIGN PATENT DOCUMENTS

| CA | 2845964 A1 | 9/2015 |
| DE | 10245396 A1 | 4/2004 |
| EP | 0032780 A1 | 7/1981 |

OTHER PUBLICATIONS

Igor Altenberger, "Deep Rolling—The Past, the Present and the Future", Conference Paper, Jan. 2005, http://www.researchgate.net/publication/274509498_Deep_Rolling_-_The_Past_the_Present_and_the_Future, accessed Oct. 29, 2015, pp. 1-13.

(Continued)

*Primary Examiner* — Edward Tolan
(74) *Attorney, Agent, or Firm* — MH2 Technology Law Group LLP

(57) ABSTRACT

Disclosed are a method and system to form a contoured structure using deep rolling. The method includes using deep rolling to introduce plastic deformation to one or more portions of a work piece to form a convex contour in the work piece. The work piece, and subsequently formed contoured structure, can be metal or composite. The disclosed deep rolling systems and methods form, for example contoured aircraft panels, while also providing fatigue strength improvement and low level of work hardening during the forming process rather than as a post-production surface treatment.

12 Claims, 9 Drawing Sheets

(56) References Cited

U.S. PATENT DOCUMENTS

| | | | | |
|---|---|---|---|---|
| 5,826,453 | A * | 10/1998 | Prevey, III | B23P 9/02 29/90.01 |
| 6,532,786 | B1 * | 3/2003 | Luttgeharm | B21D 22/16 72/115 |
| 6,622,570 | B1 * | 9/2003 | Prevey, III | B23P 9/02 72/75 |
| 6,938,448 | B2 * | 9/2005 | Kennerknecht | B21D 11/08 29/90.7 |
| 7,389,666 | B2 * | 6/2008 | Lugt | B23P 9/02 29/90.01 |
| 8,051,565 | B2 * | 11/2011 | Luna | B23P 6/002 29/889.7 |
| 8,302,442 | B2 * | 11/2012 | Kiridena | B21D 31/00 72/115 |
| 8,511,130 | B2 * | 8/2013 | Prevey, III | B23K 26/0069 29/90.01 |
| 8,733,143 | B2 * | 5/2014 | Kiridena | B21D 31/00 72/115 |
| 2005/0155203 | A1 * | 7/2005 | Prevey | B23P 9/02 29/90.01 |
| 2006/0272378 | A1 * | 12/2006 | Amino | B21D 22/185 72/305 |
| 2010/0199742 | A1 | 8/2010 | Johnson et al. | |
| 2011/0223443 | A1 | 9/2011 | Scheel et al. | |
| 2012/0024035 | A1 | 2/2012 | Kiridena et al. | |
| 2014/0366600 | A1 * | 12/2014 | Kozaki | B30B 1/186 72/20.3 |

OTHER PUBLICATIONS

Extended European Search Report for EP Appl. No. 16181882.8 dated Mar. 16, 2017.

Zhou et al., "The Mechanism and Experimental Study on Laser Peen Forming of Sheet Metal", Key Engineering Materials, vol. 315-316, Jan. 1, 2006, pp. 607-611.

Travieso-Rodriguez et al., "Improving the Surface Finish of Concave and Convex Surfaces Using a Ball Burnishing Process", Materials and Manufacturing Processes, vol. 26, No. 12, Dec. 1, 2011, pp. 1494-1502.

* cited by examiner

DEEP ROLLING FORMING

TECHNICAL FIELD

The present teachings relate generally to forming contoured structures and, more particularly, to using deep rolling to form contoured structures.

BACKGROUND

Modern aircraft utilize contoured structures, e.g. curved metal panels, in a variety of applications including skins, access panels, wing flaps, and fuselage sections. Conventional methods for forming the contoured metal panels include shot peening and laser shock peening. In shot peen forming, a flow of metal, glass or ceramic shot impacts a surface of a metal work piece to elastically and plastically stretch that surface and introduce local low plastic deformation that manifests itself as a residual compressive stress. The combination of elastic and plastic stretching and compressive stress generation causes the metal panel to develop a concave curvature on the shot peened side. Problems arise with shot peening because of process variability. Moreover, shot peening uses small shots typically made of cast iron, cut wire steel, glass or ceramics that often break and need periodic replacement. Handing and disposal of the replaced shot can cause environment problems.

Laser shock peening operates similarly to shot peening, but uses a pulsed laser instead of steel or ceramic pieces to impact the work piece. Laser shock peening, however, requires expensive equipment and time consuming masking/unmasking steps before and after forming.

These methods also increase the surface roughness of the work piece, thereby requiring additional time consuming and costly surface treatment after the contours are introduced into the metal panel. An improved method for forming contoured metal panels would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an aspect, a method for forming a contoured structure from a work piece is provided. The method includes providing the work piece that includes a first side and a second side, the work piece having a thickness of about two inches or less. The work piece can be positioned on a fixture, such that the first side of the work piece is accessible to a deep rolling tool. The deep rolling tool applies a compressive force to the first side of the work piece. The deep rolling tool can move relative to the work piece while continuing to apply the compressive force to introduce plastic deformation to a first portion of the work piece. The deep rolling tool can be adjusted to contact a second portion of the work piece and moved relative to the work piece to introduce plastic deformation to the second portion of work piece. The deep rolling tool can then be adjusted to introduce plastic deformation to one or more additional portions of the metal piece to introduce a convex contour to the first side of the work piece.

In another aspect, a panel for use on a vehicle is provided. The panel can have a thickness of 2 inches or less, a length of 1 foot or more, and a width of 0.5 feet or more. A first side of the panel can include a convex contour with a radius from about 1 inch to about 300 feet, wherein the convex contour on the first side was introduced by a deep rolling process. The first side of the panel with the convex contour can further include a surface roughness value $Ra_2$ that is less than or equal to a surface roughness value $Ra_1$, where $Ra_1$ is the surface roughness of the panel prior to the deep rolling process and $Ra_2$ is the surface roughness value after deep rolling and prior to any surface treatment.

In another aspect, a system for forming a contoured structure from a work piece is provided. The system can include a fixture to position the work piece and a first deep rolling tool including a tool element capable of applying a force of 0.1 ksi to 30 ksi to a first side the work piece. The system can further include a first computer numerically controlled (CNC) machine attached to the first deep rolling tool, where the first CNC machine controls movement of the first deep rolling tool at a rate of 0.01 inch/second to 10 inch/second relative to the work piece. The first CNC machine can also control introduction of a contour into the first side of the work piece by the first deep rolling tool, the contour having a radius of about 1 inch to about 300 feet.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

Deep rolling is a mechanical surface treatment that has been used to improve fatigue strength of metal parts that have been previously formed by, for example, casting, forging, etc. The previously formed metal parts typically include bolts, axles, wheel rims and other parts that require improved fatigue strength. In deep rolling, a tool element, such as a spherical ball or cylinder, moves over the surface of, for example, an axle while at the same time applying a compressive force to the surface of the axle. This causes low plastic deformation localized near the surface of the axle and results in improved fatigue performance of the part. Use of deep rolling, however, has been limited to improving fatigue performance of previously formed metal parts.

Systems and methods of the present teachings utilize deep rolling to form contoured structures from flat and curved work pieces. Use of the system and method is not limited to forming contoured structures from metal work pieces and can be used, for example, on composites. The exemplary deep rolling systems and methods disclosed herein avoid the process variability, expensive equipment, and subsequent surface roughness treatments associated with shot peening and laser shock peening. Furthermore, the exemplary systems and methods disclosed herein provide fatigue strength improvement and low level of work hardening during the forming process rather than as a post production surface treatment.

Figure 1:
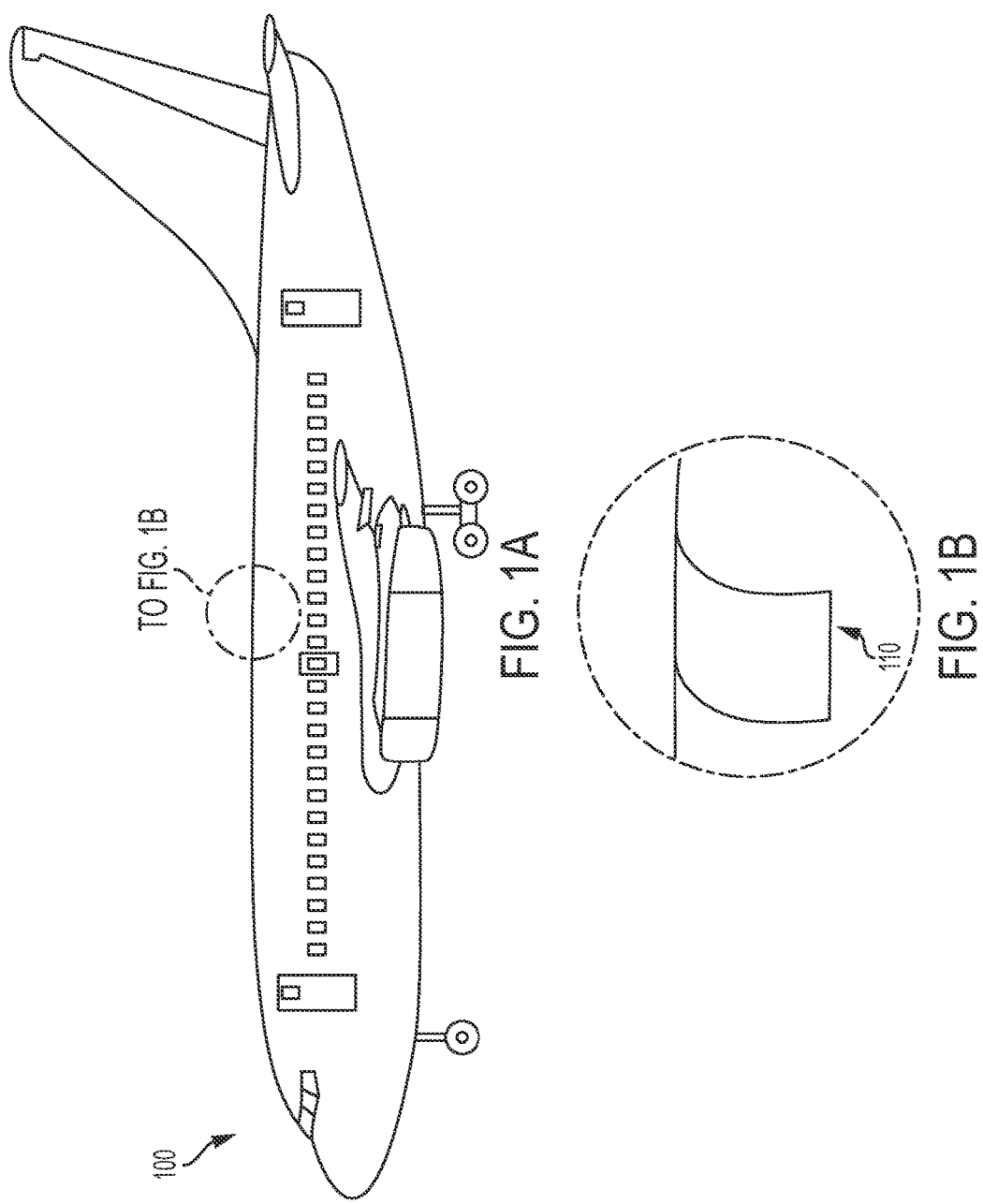
FIGS. 1A and 1B depict an aircraft including various contoured metal panels.

FIG. 1A depicts an aircraft 100 that includes a number of contoured metal structures such as aircraft skins, access panels, wing flaps, wingskins, and fuselage sections, An aluminum skin panel 110 shown in FIG. 1B is an example of a metal structure that is contoured for aerodynamic reasons. The description below may reference a metal skin panel for an aircraft as an example to illustrate the exemplary methods, however, one of ordinary skill in the art will understand that metal structures used on other vehicles are contemplated and other types of materials besides aluminum are contemplated including, but not limited to titanium, steels, carbon-fiber-reinforced polymer composites, other polymer/plastic matrix composites, metal matrix composites, and ceramic matrix composites.

Figure 2:
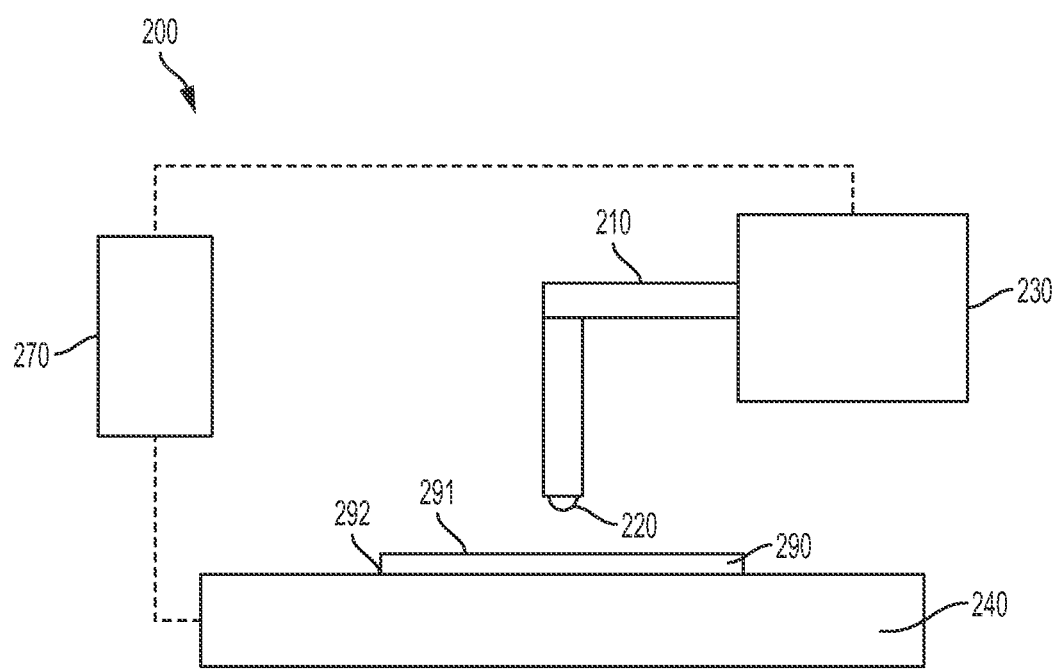
FIG. 2 depicts an exemplary system for forming a contoured structure from a work piece according to the present teachings.

FIG. 2 depicts an exemplary deep rolling system 200 that can be used to form a contoured structure from a work piece. As used herein, the term "work piece" refers to an initial structure, e.g. a metal panel or plate, on which deep rolling will introduce a contour or contours to form a contoured structure, e.g., a metal skin panel for an aircraft. The work piece can be flat or can already include contours. As used herein, the term "contoured structure" refers to a work piece on which deep rolling has introduced one or more curves/curvatures. Deep rolling system can include a fixture 240, a deep rolling tool 210 and a computer numerically controlled (CNC) machine 230. Deep rolling system 200 can further comprise a control system 270 that includes, for example, a hydraulic pressure pump, instruments, and sensors that in-situ monitor, control, and record the process parameters. Control system 270 can be connected to control fixture 240, deep rolling tool 210, and/or CNC machine 230. Fixture 240 can position a work piece 290 so that one side is accessible to deep rolling tool 210. Fixture 240 and deep rolling tool 210 can be configured so that one moves while the other is stationary. In another example, fixture 240 and deep rolling tool 210 can be configured so that both move.

Figure 3A:
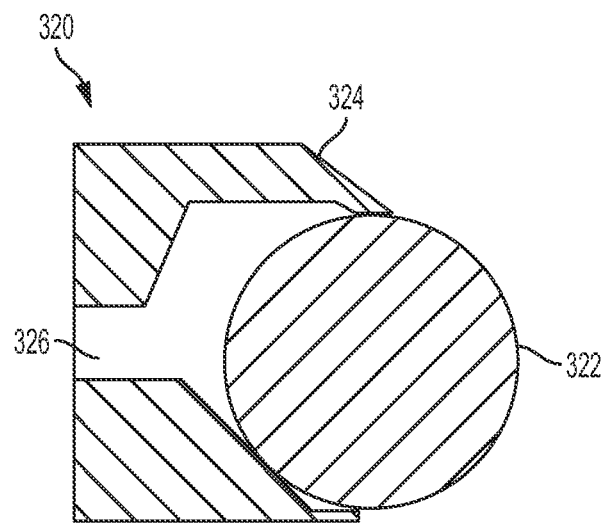
FIGS. 3A-B depict exemplary deep rolling tool elements according to the present teachings.

Deep rolling tool 210 can include a deep rolling head 220. Deep rolling head 220 includes an element, typically spherical or cylindrical in shape, to contact the surface of work piece 290 to introduce localized low plastic deformation to the surface of work piece 290. FIG. 3A depicts an exemplary head 320 comprising a spherical ball element 322 that can be hydrostatically suspended by a ball retainer 324. A cavity 326 can hold pressurized liquid, such as a coolant or oil. Spherical ball 322 can rotate in any direction within ball retainer 324. Spherical ball 322 can have a diameter, for example, from about 0.05 inches to about 1 inch.

Figure 3B:
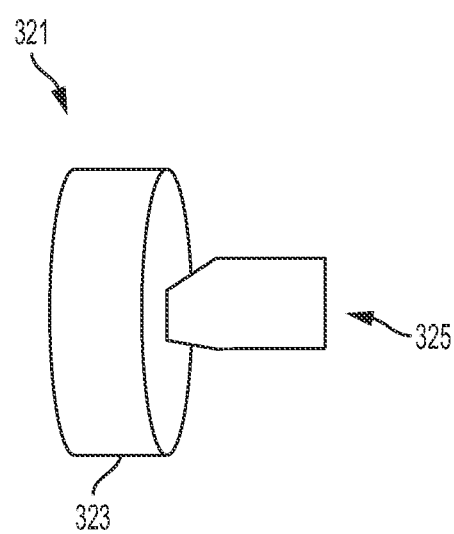

Deep rolling tool can alternatively comprise a cylindrically shaped element. FIG. 3B depicts a cylindrical element 321 that can rotate about a fixed axis, shown as axis 325. Cylindrical element 321 can have a dimension, for example, of 0.1 inch diameter by 0.25 inches length to 3.0 inches diameter by 12 inches length.

Deep rolling system 200 can include a computer numerically controlled (CNC) machine 230. Although referred to as a CNC machine herein, one of ordinary skill in the art will understand that CNC machine 230 can include multi-axis CNC machines as well as conventional machines. CNC machine 230 can be, for example, a turning machine, drilling machine, milling machine, machining centers, or a conventional machine tool. CNC machine 230 can control the location and force deep rolling tool 210 exerts on the surface of work piece 290.

Figure 4:
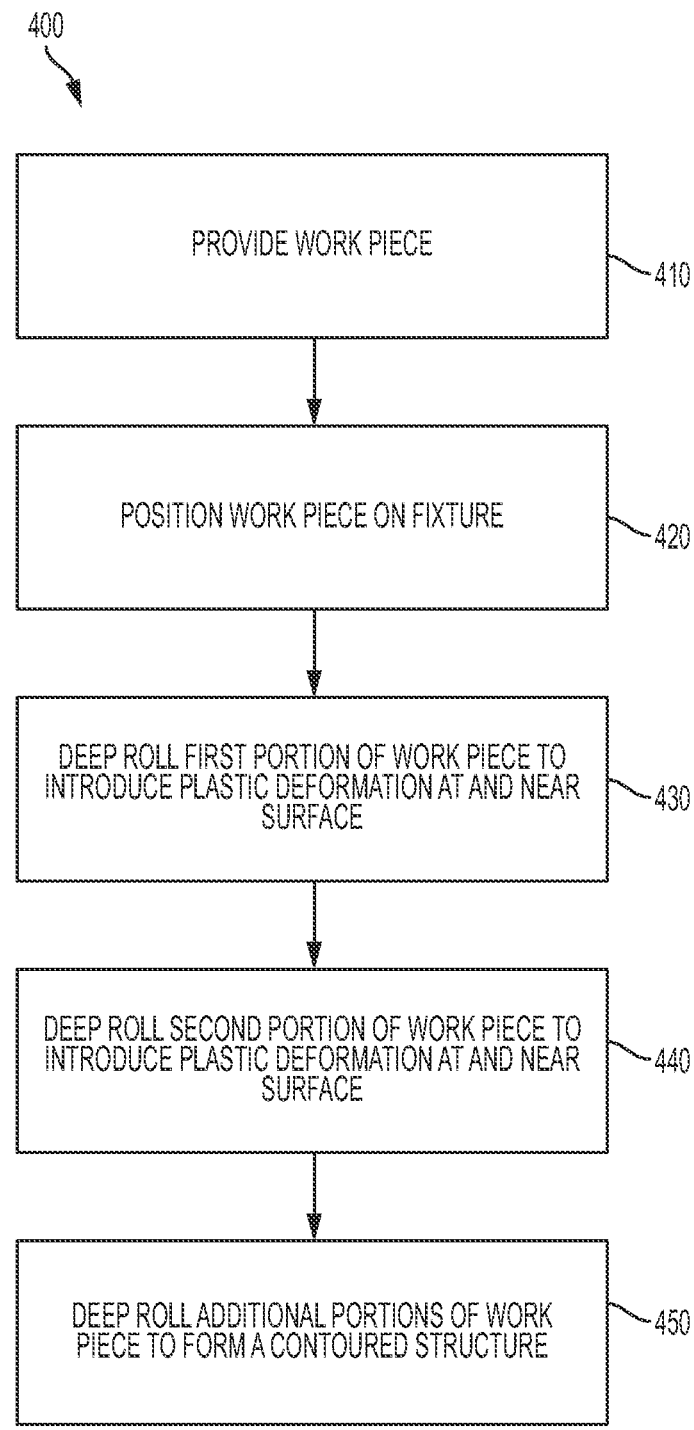
FIG. 4 depicts an exemplary method for using deep rolling to produce a contoured structure according to the present teachings.

FIG. 4 depicts an exemplary method 400 for forming a contoured structure according to the present teachings. Although exemplary method 400 describes forming a contoured metal structure from a metal work piece, other work pieces and contoured structures are contemplated including composite work pieces and contoured composite structures. At 410, a metal work piece is provided that will be formed into a contoured metal structure. A metal work piece 290, shown in FIG. 5A, can be a metal structure made of aluminum, titanium, steel or other metals that can be formed into a contoured metal structure for use on a vehicle such as an aircraft. The metal work piece can be flat or include contours/curves. It can also include other structural elements such as, for example, openings, windows and the like. Metal work piece 290, shown in a side view in FIG. 2, can include a first side 291 and a second side 292. First side 291 corresponds to the top surface in FIG. 2 and second side 292 corresponds to the bottom surface facing fixture 240. Metal work piece 290 can have a thickness of about 2 inches or less, a length of about 1 foot or more, and a width of about 0.5 feet or more. An exemplary work piece to be formed into an aircraft wing structure can have a length of up to about 150 feet and a width of up to about 40 feet.

At 420 of FIG. 4, the metal work piece can be positioned on a fixture so that one side is accessible to a deep rolling tool. For example, referring back to FIG. 2, fixture 240 can position work piece 290 so that deep rolling tool 210 can physically contact top surface 291 of work piece 290.

At 430, the deep rolling tool can introduce plastic deformation to the work piece by applying a compressive force to the surface of the work piece. Referring back to FIG. 2, CNC machine 230 can be programmed so that deep rolling tool 210 applies a compressive force ranging from 0.05 ksi to 150 ksi to first surface 291 of work piece 290. For example, a compressive force of 0.1 ksi to 15 ksi can be applied to an aluminum alloy or a compressive force of 0.1 ksi to 30 ksi can be applied to a titanium alloy.

Plastic deformation can be introduced to a first portion of the work piece by moving the deep rolling tool relative to the work piece while continuing to apply the compressive force. By controlling, among other parameters, the force applied by the deep rolling tool to the surface and the path of the deep rolling tool as it moves along the surface, a contour can be introduced to the work piece to form the contoured structure. For example, CNC machine 230 can be programmed to move deep rolling tool 210 relative to work piece 290 while continuing to apply the compressive force to surface 291. For example, deep rolling tool 210 can move at a rate of 0.01 inch/second to 20 inch/second relative to work piece 290.

Figure 5A:
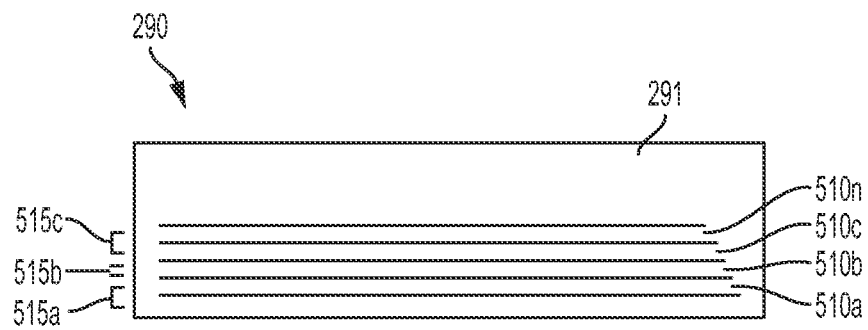
FIGS. 5A-C depict exemplary deep rolled portions of a metal work piece and paths of a deep rolling tool during formation of a contour in a work piece according to the present teachings.
Figure 5B:
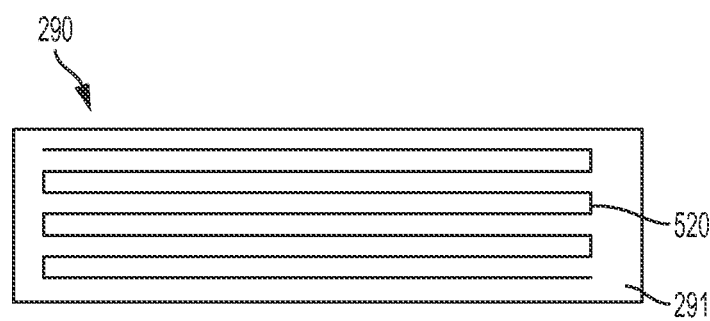
Figure 5C:
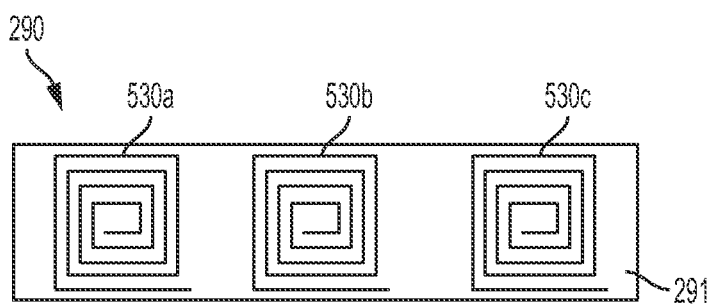

CNC machine 230 can be programmed to control a path of deep rolling tool 210 as it travels along first surface 291. For example, the CNC machine can control movement of the deep rolling tool so that plastic deformation can be introduced to one or more portions of the work piece. As used herein, the term portion refers to a part of the work piece being subject to deep rolling. For example, a portion can be a circular or polygon shaped area on the work piece. A portion can also be a line segment or line segments over which the deep rolling tool travels. FIGS. 5A-C shows a top view of first surface 291 of work piece 290. Several exemplary paths 510, 520, and 530 on first surface 291 are shown. Each of the examples represents the path a deep rolling tool can travel as it introduces plastic deformation into portions of the surface of the work piece. FIG. 5A shows a plurality of paths 510*a*, 510*b*, 510*c* . . . 510*n*, where each path corresponds to a portion of the work piece. For example, first portion 515*a*, second portion 515*b*, and third portion 515*c* represent portions of work piece 290 in which plastic deformation has been introduced. Each of portions 515*a*, 515*b*, and 515*c* correspond to paths 510*a*, 510*b*, and 510*c*, respectively. For example, plastic deformation can be introduced into first portion 515*a* of work piece 290 by applying a compressive force while moving deep rolling tool along path 510*a*.

FIG. 5B depicts another example path 520. Although depicted as a single path, deep rolling tool 210 is adjusted to change its direction and/or location to treat multiple portions of work piece 290. FIG. 5C depicts yet another example path. Paths 530*a*, 530*b* and 530*c* are rectangular shaped and each treat separate portions of work piece 290. One of ordinary skill in the art will understand that other shaped paths, for example circular or spiral paths, are contemplated and depend on a number of factors including the desired contour, type of material, size of the work piece, orientation of the work piece on the fixture, and specific application for the contoured structure. For example, different paths can be used to introduce the same contour to a work piece.

Deep rolling tool 210 can move along a same path one or more times, for example, 1 to 10 times, while applying compressive stress. Moreover, the amount of compressive force applied by deep rolling tool 210 can vary as it moves along a path.

At 440 of FIG. 4, the deep rolling tool can be adjusted so compressive force is applied to a second portion of the work piece. Referring to FIG. 5A, subsequent to deep rolling tool 210 moving along path 510*a* one or more times, it can be adjusted so that it applies compressive force while moving along path 510 *b* one or more times. This introduces plastic deformation to second portion 515*b* of metal work piece 290. As previously discussed, the compressive stress applied by deep rolling tool 210 can be constant or varied as it moves along path 510*b*. The compressive stress applied by deep rolling tool 210 as it moves along path 510*b* can be the same or different than the compressive stress applied along path 510*a*. While depicted as parallel paths, one ordinary skill in the art will understand that the direction of the paths can vary dependent on the contour(s) desired.

At 450, the deep rolling tool can be adjusted so compressive force is applied to one or more additional portions of the work piece. Referring to FIG. 5C, deep rolling tool 210 can be adjusted so that it applies compressive force while moving along path 510*c* one or more times. This introduces plastic deformation to third portion 515*c* of metal work piece 290. One of ordinary skill in the art will understand that the number of portions, the locations of the paths, the number of passes along each path, and the compressive stress can be varied to form the desired contour or contours.

Figure 6:
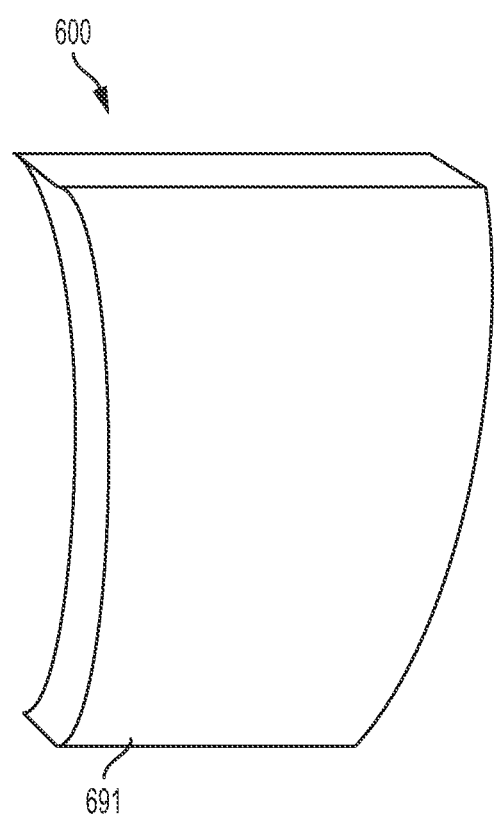
FIG. 6 schematically depicts a contoured metal structure formed by deep rolling according to the present teachings.

Subsequent to the application of compressive force to the first, second, and one or more additional portions of the work piece, a contour is introduced. As shown in FIG. 6, a contoured metal structure 600 can be formed from metal work piece 290. First surface 291 of work piece corresponds to convex contoured surface 691 of metal structure 600. In other words, application of compressive force in a certain range on first surface 291 of work piece 290 results in a convex contour in metal structure 600. The convex contour can have a radius from about 1 inch to about 300 feet, or about 5 inches to 200 feet, or about 12 inches to about 50 feet. Deep rolling can be used to form contoured metal structures 600 having a width of about 2 inches or less, a length of about 1 foot or more, and a width of about 0.5 feet or more.

Figure 7:
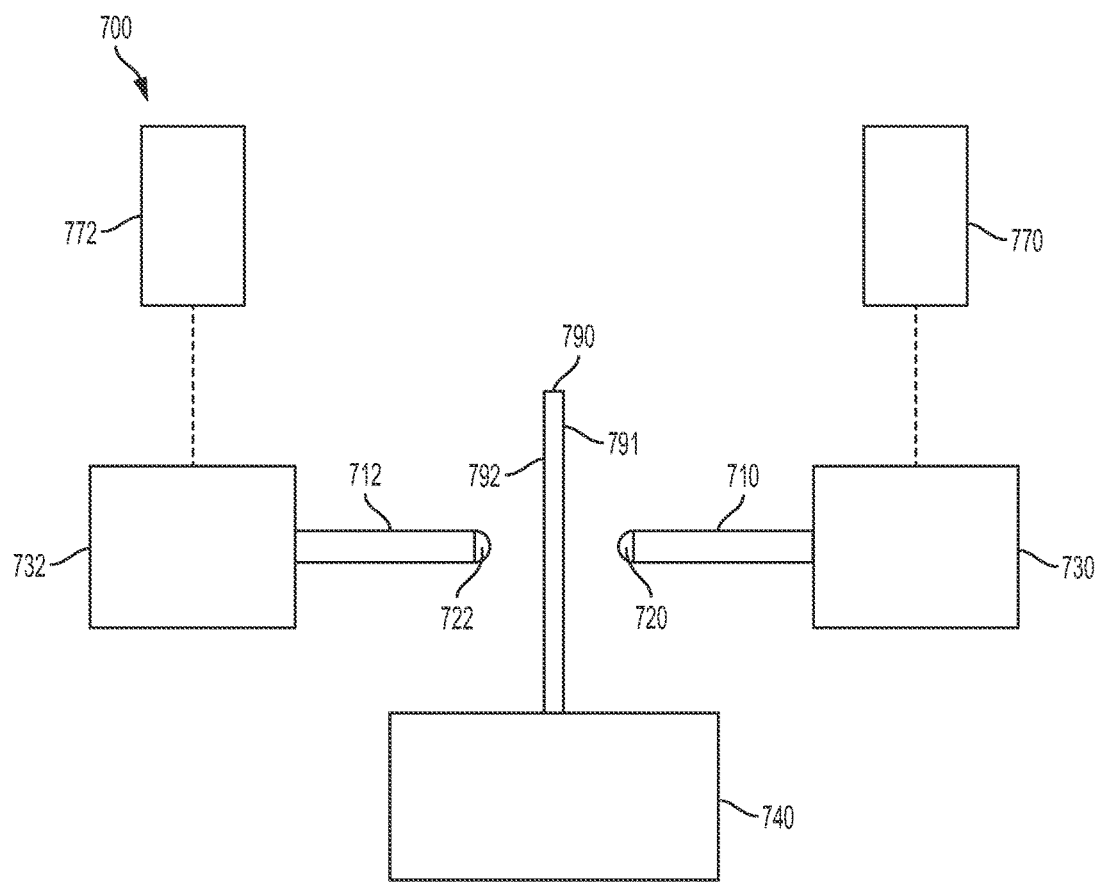
FIG. 7 depicts another exemplary system for forming a contoured structure from a work piece according to the present teachings.

FIG. 7 depicts another deep rolling system that includes two tools to introduce compressive residual stress to both sides of a work piece simultaneously. An exemplary deep rolling system 700 can include a first deep rolling tool 710 having a first element 720, a first computer numerically controlled (CNC) machine 730, and a first control system 770 that can include, for example, a hydraulic pressure pump, instruments, and sensors that in-situ monitor, control, and record the process parameters. Deep rolling system 700 can further include a second deep rolling tool 712 having a second element 722, a second computer numerically controlled (CNC) machine 732, and a second control system 772 that can include, for example, a hydraulic pressure pump, instruments, and sensors that in-situ monitor, control, and record the process parameters.

Deep rolling system 700 can include a fixture 740 that can position a work piece 790 so that a first side 791 is accessible to first deep rolling tool 710 and a second side 792 is accessible to second deep rolling tool 712. Although depicted in a vertical configuration, one of ordinary skill in the art will understand that other configurations are contemplated. Deep rolling system 700 can be used to form a contour or contours on work piece 790 by introducing compressive residual stress on side 791 and 792 simultaneously or sequentially. In another example, contours can be formed in work piece 790 by alternatingly introducing compressive residual stress first into side 791 and then into side 792, and then repeating as desired.

Figure 8:
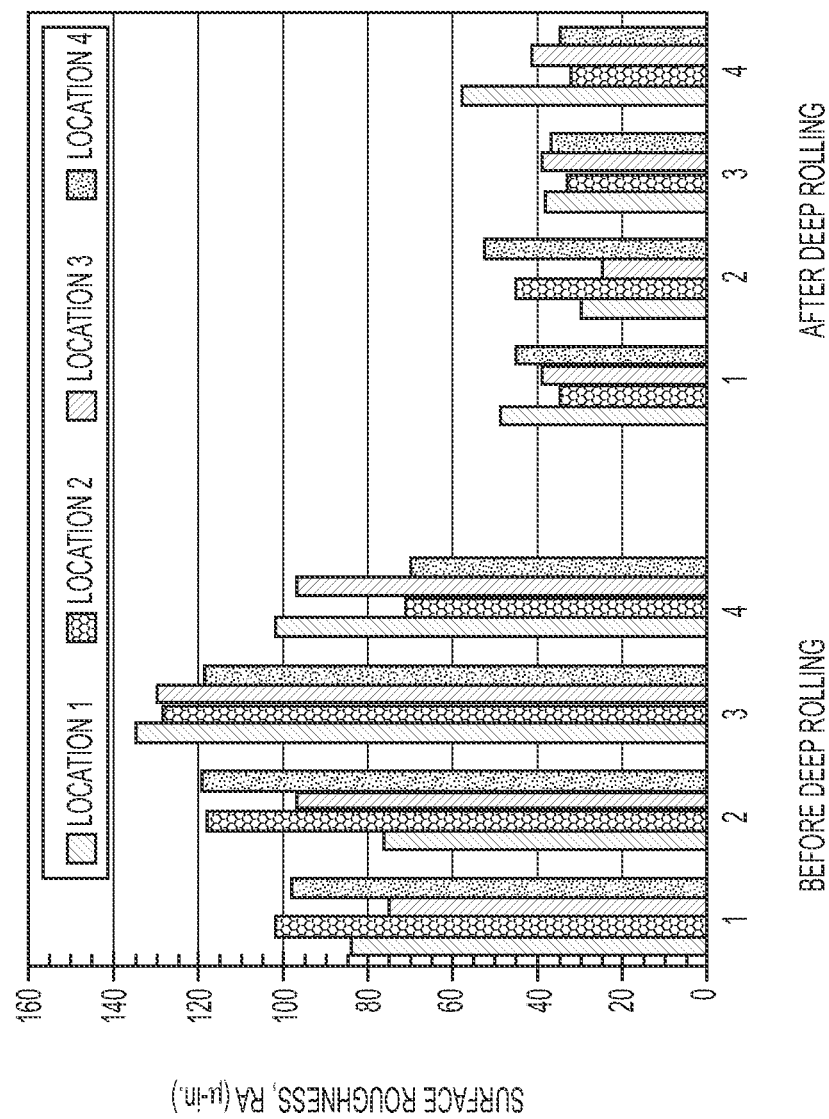
FIG. 8 shows surface roughness measured on 7075 aluminum samples before and after deep rolling.

The disclosed deep rolling system can be incorporated into existing workflows for manufacturing contoured structures, such as, for example, metal panels for use as aircraft skins. Referring back to FIGS. 4 and 6, forming contoured structures using deep rolling method 400 can provide additional advantages. For example, the surface roughness of contoured structure 600 remains the same or can be improved compared to the surface roughness prior to deep rolling. FIG. 8 shows results of surface roughness measurements before and after deep rolling of 7050 aluminum. Surface roughness was measured on four samples, numbered 1 thru 4, prior to deep rolling. Measurements were taken at four different locations. The surface roughness prior to deep rolling varied from about 70-130 micro-inch as shown on the left side of FIG. 8. After deep rolling and prior to any surface treatment that would alter surface roughness, measurements were made at the same four locations. As shown on the right side of FIG. 8, the surface roughness decreased to about 30-55 micro-inch. In contrast, forming a curved structure by shot or laser shock peening significantly increases the surface roughness and requires subsequent surface treatment to reduce the surface roughness before moving onto the next step in the manufacturing work flow.

Figure 9:
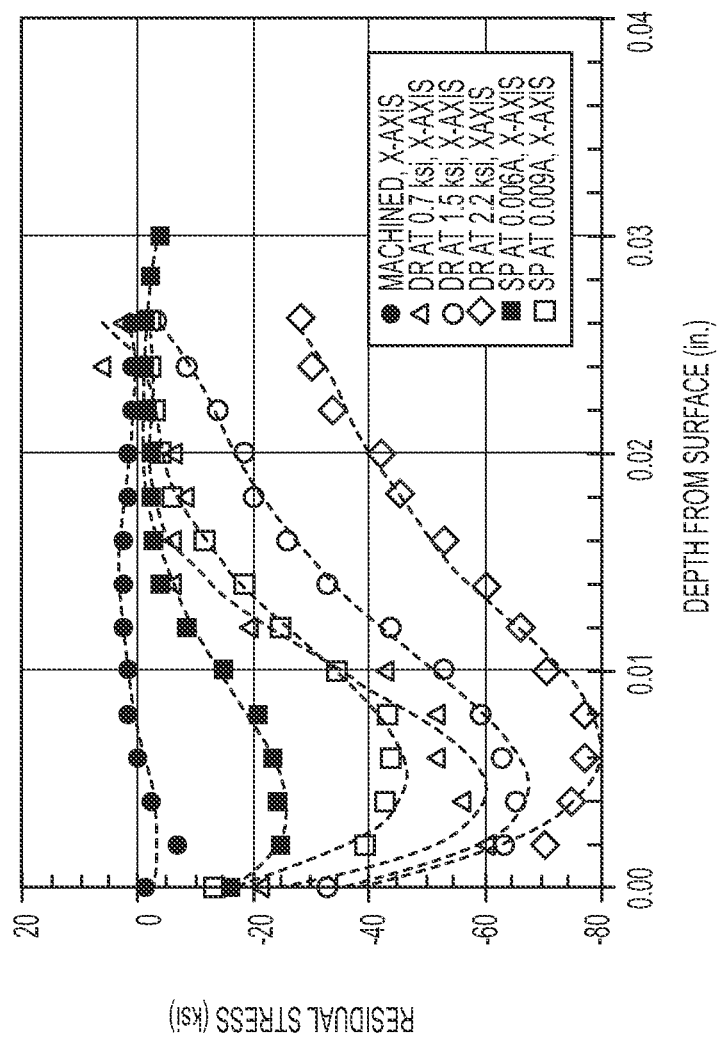
FIG. 9 shows measured residual stress profiles for machined, deep rolled, and shot peened 7075 aluminum samples.

Using deep rolling to form contoured structures can also provide higher and deeper residual stress. This can improve the productivity and efficiency of contour forming and allow formation of a wider range of contour curvatures. Fatigue properties can also be enhanced by deeper and higher residual stress. FIG. 9 shows residual stress profiles for machined, shot peened, and deep rolled 7050 aluminum samples. Residual stress measured for samples deep rolled were higher and extended further into the sample compared to machining and shot peening. For samples deep rolled at 0.7 ksi, the residual stress was about −10 ksi or more at a depth of 0.02 inches from the surface of the sample. For samples deep rolled at 1.5 ksi, the residual stress was about −20 ksi or more at a depth of 0.02 inches from the surface of the sample. In contrast, the machined and shot peened samples showed residual stress of less than about −5 ksi at a depth of 0.02 inches.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming a contoured structure from a work piece, the method comprising:
    providing the work piece comprising a first side and a second side, the work piece having a thickness of about two inches or less;
    positioning the work piece on a fixture, such that the first side of the work piece is accessible to a deep rolling tool;
    applying a compressive force to the first side of the work piece with the deep rolling tool;
        moving the deep rolling tool relative to the work piece while continuing to apply the compressive force to introduce a residual compressive stress localized at or near a surface of the first portion of the work piece;
    adjusting the deep rolling tool to contact a second portion of the work piece and moving the deep rolling tool relative to the work piece to introduce a residual compressive stress localized at or near a surface of the second portion of the work piece; and
    adjusting the deep rolling tool to contact one or more additional portions of the work piece and moving the deep rolling tool relative to the work piece to introduce a residual compressive stress localized at or near a surface of the one or more additional portions of the work piece and to introduce a convex contour into the work piece, wherein the convex contour has a radius of from one inch to 300 feet.

2. The method of claim 1, wherein the first portion, second portion, and additional portions of the work piece each comprise a plurality of parallel adjacent line segments.

3. The method of claim 1, wherein the first portion, second portion, and additional portions of the work piece each comprise a square or rectangular shaped area on the first side of the work piece.

4. The method of claim 1, wherein the deep rolling tool comprises a spherical ball having a diameter from 0.05 inches to 1 inch or one or more cylinders each cylinder having a dimension of 0.1 inch diameter by 0.25 inches length to 3.0 inches diameter by 12 inches length.

5. The method of claim 1, wherein an amount of compressive force applied by the deep rolling tool to portions of the work piece range from 0.1 ksi to 30 ksi.

6. The method of claim 1, wherein moving the deep rolling tool relative to the work piece comprises moving the deep rolling tool at a rate of 0.01 inch/second to 10 inch/second.

7. The method of claim 1, wherein moving the deep rolling tool relative to the work piece to introduce the residual compressive stress localized at or near the surface of the first, the second, or the one or more additional portions of the work piece comprises moving the deep rolling tool over a same portion of the work piece from 1 to 10 times.

8. The method of claim 1, wherein a surface roughness of the first side of the contoured structure subsequent to introduction of the residual compressive stress by the deep rolling tool is equal to or less than a surface roughness of the first side of the work piece prior to introduction of the residual compressive stress by the deep rolling tool.

9. The method of claim 1, wherein the work piece comprises a metal or composite.

10. The method of claim 1, wherein an amount of force applied by the deep rolling tool to introduce the residual compressive stress to the first portion of the work piece varies.

11. The method of claim 1, further comprising:
applying another compressive force to the second side of the work piece with a second deep rolling tool to introduce a residual compressive stress localized at or near a surface of a portion of the second side of the work piece.

12. The method of claim 11, wherein the applying of the another compressive force to the second side of the work piece occurs simultaneously as the compressive force is applied to the first side.

* * * * *